Sept. 9, 1924.

J. F. O'CONNOR 1,508,119

FRICTION SHOCK ABSORBING MECHANISM

Filed Aug. 7, 1922    2 Sheets-Sheet 1

Witnesses
Wm. Geiger

Inventor
John F. O'Connor
By Geo. I. Haight
His Atty.

Sept. 9, 1924.  
J. F. O'CONNOR  
1,508,119  
FRICTION SHOCK ABSORBING MECHANISM  
Filed Aug. 7, 1922  
2 Sheets-Sheet 2
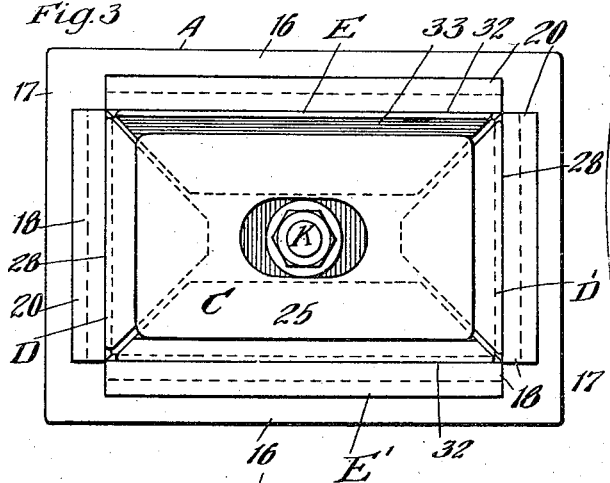
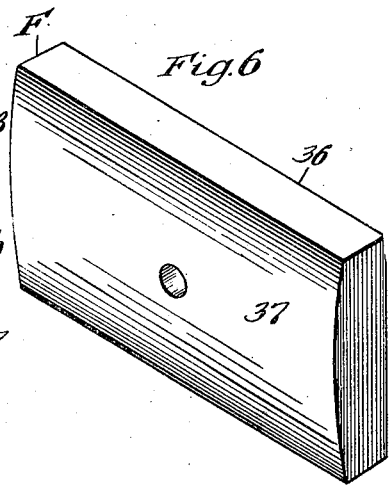
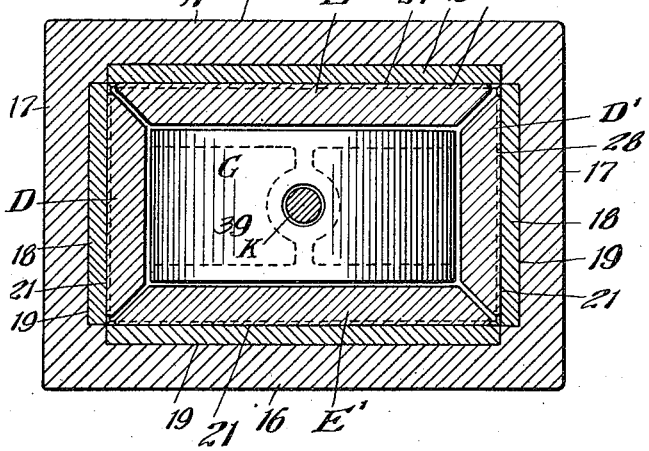
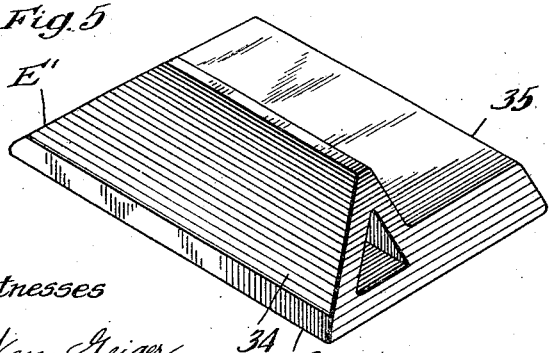
Witnesses  
Wm. Geiger
Inventor  
John F. O'Connor  
By Geo. S. Haight  
His Atty.

Patented Sept. 9, 1924.

1,508,119

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed August 7, 1922. Serial No. 580,008.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings and wherein are obtained high capacity and certain release, the mechanism being provided with a relatively large area of friction wearing surfaces.

Another object of the invention is to provide a mechanism of the character indicated wherein are employed a system of wedges and shoes so arranged that certain wedge faces of keen angle are utilized primarily in developing capacity and other wedge faces of relatively blunt angle are utilized primarily in effecting release.

A specific object of the invention is to provide a mechanism of the character indicated in the preceding paragraph, wherein is employed means for automatically insuring a balanced spring resistance to movement of the friction elements during a compression stroke.

Figure 1:
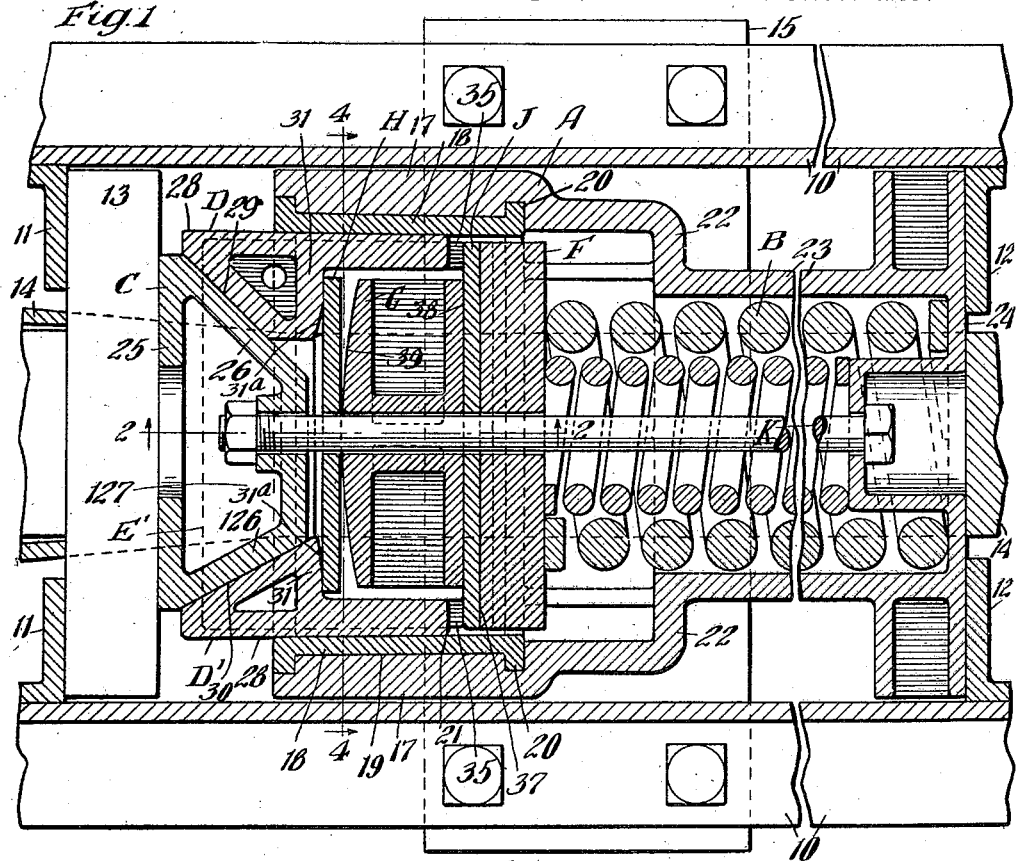
Figure 2:
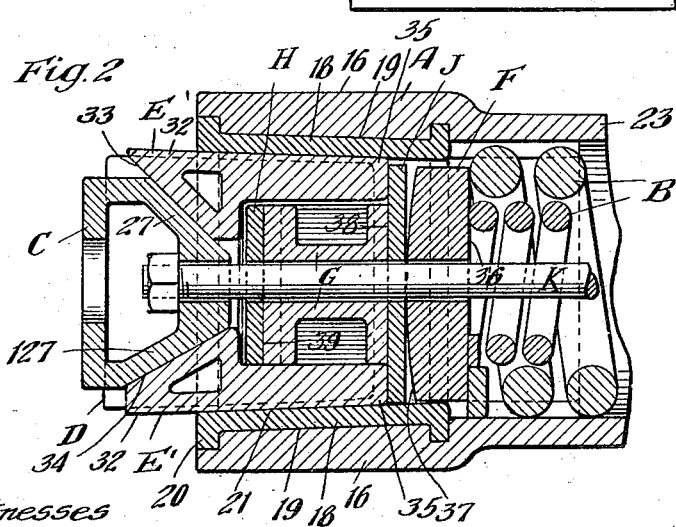

In the drawings forming a part of this specification, Figure 1 is a horizontal sectional view of a portion of a railway draft rigging showing my improvement in connection therewith. Fig. 2 is a vertical sectional view, parts being broken away, corresponding to the section line 2—2 of Fig. 1. Fig. 3 is a front end elevation of the shock absorbing mechanism proper. Fig. 4 is a vertical transverse section view of the shock absorbing mechanism proper corresponding to the line 4—4 of Fig. 1. And Figs. 5 and 6 are detail perspectives of one of the friction shoes and a spring follower, respectively, employed in my mechanism.

In said drawings, 10—10 denote the usual channel draft sills of a car underframe to the inner faces of which are secured front stop lugs 11 and rear stop lugs 12. The shock absorbing mechanism proper, hereinafter described, and a front follower 13 are disposed within a hooded cast yoke 14, by which the mechanism is operatively associated with a draw bar. The yoke and parts therein are supported in operative position by a detachable saddle plate 15.

The improved shock absorbing mechanism proper, as shown, comprises, broadly, a combined friction shell and spring cage casting A; a spring resistance B; a pressure-transmitting wedge C; two opposed friction shoes D and D'; another set of opposed friction shoes E and E'; a spring follower F; a block G; two spring plates H and J; and a retainer bolt K.

The casting A is formed at its front or outer end with a friction shell proper of rectangular cross-section, the same having top and bottom walls 16—16 and side walls 17—17. Each of said walls 16 and 17 is provided on its interior with a longitudinally extending friction surface which is preferably provided by renewable wear plates 18, the latter being detachably interlocked with the casting proper by suitable recesses 19 and flanges 20. The friction surfaces on the inner sides of the plates 18, indicated at 21, are preferably slightly converged or tapered inwardly of the shell. Rearwardly of the shell proper, above described, the casing A is reduced in cross section, thus forming transverse shoulders 22 and from the shoulders 22 to the rear end thereof, the casting A constitutes a spring cage 23 for the spring B. At its rear end, the casting A has a rear wall 24 which is laterally extended and suitably reinforced so as to adapt it to act as the rear follower of the mechanism in conjunction with the stop lugs 12.

The wedge C is preferably in the form of a hollow cast block the same having an outer flat wall 25 bearing upon the follower 13, opposed side walls 26 and 126, and opposed top and bottom walls 27 and 127.

The two side friction shoes D and D', constituting one set, are of substantially like construction except as hereinafter described and each is provided on its exterior with a longitudinally extending friction surface 28 co-operable with the corresponding shell friction surface 21. Each shoe D and D' is also provided with a wedge section on its inner side, the wedge section of the shoe D having a wedge face 29, which is inclined rearwardly toward the axis of the mechanism at a relatively blunt and substantially nonwedge acting angle, said wedge face 29 co-operating with the opposed face on the wall 26 of the wedge C. The shoe D' is provided with an opposed wedge face 30, which is inclined rearwardly and toward the axis of the mechanism at a relatively keen or sharp, true wedging angle and of a comparatively high friction creating slope. Said wedge face 30 cooperates with the corresponding inclined face on the wall 126 of the wedge C. Each of the shoes D and D' is further provided with a transverse shoulder 31, the latter being curved or chamfered at their inner ends as indicated at 31$^a$ for the purposes hereinafter described.

The other set of shoes comprising the upper and lower shoes E and E', best shown in Fig. 2, are provided with friction surfaces 32, cooperable with the corresponding shell friction surfaces 21, and the shoe E has a blunt angle wedge face 33 cooperable with the corresponding wedge face on the wall 27 of the wedge C. The other shoe E' has a relatively keen wedge-acting face 34 cooperable with a corresponding wedge face formed on the wall 127 of the wedge C. The shoes E and E' are inwardly extended, to a point beyond the inner ends of the shoes D and D'. Said inwardly extended ends of the shoes E and E' are indicated at 35, bearing upon the spring plate J, as shown best in Fig. 2.

The spring follower F, at the front end of the spring B, has a flat rear bearing face 36 engaging the adjacent end of the spring B, and on its forward side the follower F is made cylindrical as indicated at 37, the axis of the cylindrical surface 37 extending horizontally or transversely of the mechanism. With this arrangement of cylindrical surface 37, it is evident that the top and bottom edges of the spring plate J will normally be spaced from the surface 37, as shown in Fig. 2, but that a bearing will be provided between the plate J and the follower F, along the center line of the latter.

The block G has a flat rear bearing face 38 engaging the front side of the plate J. At its forward end, the block G is provided with a cylindrical bearing surface 39, the axis of said surface extending vertically or at right angles to the axis of the cylindrical surface 37. With this arrangement of the bearing surface 39, it is evident that, normally, the side edges of the steel spring plate H will be spaced from the surface 39, but that there will be a bearing between said plate H and the block G along the center line of the bearing surface 39.

The retainer bolt K is anchored at its rear end within a hollow boss integral with the casting A and at its forward end within the wedge C, the wedge C, plates H and J, block G and spring follower F, being suitably apertured to accommodate the shank of the bolt. Said bolt not only retains all of the parts in assembled relation, but may also be employed to place the spring B under initial compression so as to thereby provide for automatic compensation as wear occurs on the various parts.

During a compression stroke, as the wedge C and two sets of friction shoes are moved inwardly relatively to the shell, it is evident that no appreciable or substantial wedging action or slippage will occur between the wedge C on the one hand, and the respective blunt angle friction shoes D and E, due to the very blunt angle of the wedge faces on said shoes D and E. Consequently, the wedge C and the shoes D and E will move inwardly of the shell substantially as a solid unit. On the contrary, due to the keen angle of the wedge faces on the wedge C, and shoes D' and E', slippage or true wedging action will occur between the wedge C on the one hand and the shoes D' and E' on the other hand, thus setting up a very high frictional capacity. Due to the wedging action taking place between the wedge C and the shoes D' and E', there is a tendency for the wedge C and the blunt angle shoes D and E to advance longitudinally slightly with respect to the other shoes D' and E'. This relative longitudinal shifting between the friction elements may be further increased by reason of the tapered friction shell and it is in order to positively insure a balanced spring resistance to all of the friction shoes, that I employ the cylindrical surfaces 37 and 39 on the follower F and block G, respectively, in combination with the steel spring plates H and J, since it will be evident that, should the shoe D, for instance, advance relatively to the shoe D', the spring resistance afforded the shoes D and D' will be automatically compensated for or balanced by reason of the plate H flexing on the bearing surface 39. Similarly with respect to the shoes E and E', the automatic compensation is obtained by the plate J flexing on the bearing surface 37 of the follower F. While I have shown the balancing feature employed in a mechanism having two sets of friction shoes, it will be evident nevertheless to those skilled in the art, that the same idea may be employed in a mechanism having only one set of friction shoes.

Upon removal of the actuating pressure, it is evident that tremendous forces will be stored up in the friction shell which has been expanded. Consequently, the shell will contract and the forces therefrom will be exerted radially on the shoes. Considering first the contraction of the shell with respect to the release action, it is obvious that the inclined faces 30 and 126 and 34 and 127 extend at a relatively blunt or non-releasing angle with respect to such radial releasing forces and consequently such forces are not effective during initial release. Conversely, the faces 29 and 26 and 33 and 27, which are of suitable releasing angle, oppose no substantial resistance or sticking action to the radially inwardly contracting forces of the shell, so that said sets of faces act as wedges at this time, to functionally free the wedge C from the shoes D and E, or otherwise leave loose or loosen said wedge; whereupon the group of friction elements collapses sufficiently for the spring B to restore all parts to normal position, the parts properly positioning themselves in relation to each other at the end of the release action. The proper positioning of the parts is, of course, further facilitated by reason of the spring plates H and J which automatically tend to restore the shoes of each set into an equalizing position. Irrespective of the contracting forces of the shell and considering the wedge C at the moment when the buffing or pulling force ceases, it is free to drop away from the shoes D and E, the sets of faces 29 and 26, and 33 and 27 opposing no effective resistance thereto. The intial collapse or break in the friction elements, therefore, occurs between the faces 29 and 26, and 33 and 27. The taper of the shell is also of assistance in facilitating restoration of all of the parts to normal position, inasmuch as the friction parts, when initially collapsed or released may readily be projected outwardly under the influence of the spring B without danger of the shoes catching or jamming on the walls of the shell.

In my improvement, it will be observed that I can obtain substantially any desired wedging effect and at the same time insure certain release. All of the parts are of simple construction and may be manufactured as ordinary castings at comparatively small expense. It will be also observed that I obtain a very large friction wearing area, utilizing the four interior surfaces of the friction shell.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell having interior friction surfaces; of opposed friction shoes cooperable directly with said shell friction surfaces; pressure-receiving and transmitting wedging means extended between the shoes, said means and shoe on one side of the axis of the shell having engaging faces extending at a keen angle with respect to said axis, said means and opposed shoe on the other side of said axis having cooperating faces inclined at a blunt releasing angle with respect to said axis; a spring resistance; and means interposed between said spring resistance and the shoes for automatically balancing the spring pressure on the shoes.

2. In a friction shock absorbing mechanism, the combination with a friction shell having interior sets of opposed friction surfaces; of a plurality of sets of opposed friction shoes cooperable with the friction surfaces of the shell; pressure receiving and transmitting wedging means extended between said shoes, said means and shoe of one set on one side of the axis of the shell having engaging faces extending at an acute angle with respect to said axis, said means and opposed shoe of the corresponding set, on the other side of the axis, having cooperating faces inclined at a blunt releasing angle with respect to said axis; a spring resistance; and means interposed between said spring resistance and all of the shoes, for automatically balancing the spring pressure on the shoes.

3. In a friction shock absorbing mechanism, the combination with a friction shell having interior friction surfaces; of opposed friction shoes cooperable directly with said shell friction surfaces; a shock transmitting wedge operating between said shoes, one of said shoes having a wedge face at an angle which is acute and of high friction-creating capacity and non-releasing, and another opposing friction shoe having a face engaged by said shoe at a wedge-releasing angle opposed to said face of the first shoe; a spring resistance; and means, interposed between said spring resistance and said shoes, for automatically balancing the spring pressure on said shoes.

4. In a friction shock absorbing mechanism, the combination with a friction shell having a plurality of sets of opposed friction surfaces on the interior thereof; of corresponding sets of opposed friction shoes cooperable with the friction surfaces of the shell; a shock transmitting wedge operating between and cooperable with all of said shoes, one of said shoes of each set having a wedge face at an angle which is acute and of high friction creating capacity and non-releasing, and another opposing friction shoe of each set having a face engaged by said wedge at a wedge releasing angle opposed to said wedge face of the other shoe of the corresponding set; a spring resistance; and means, interposed between said spring resistance and all of the shoes, for automatically balancing the spring pressure on the shoes.

5. In a friction shock absorbing mechanism, the combination with a friction shell; of opposed friction shoes cooperable therewith; pressure-receiving and transmitting wedging means extended between the shoes, said means and shoe on one side of the axis of the shell having engaging faces extending at a keen wedging angle with respect to said axis, said means and opposed shoe on the other side of said axis having cooperating faces inclined at a blunt releasing angle with respect to said axis; a spring resistance; and means interposed between said spring resistance and the shoe for automatically balancing the spring pressure on the shoes, said means comprising a spring follower at the end of the spring resistance adjacent the shoes and a spring plate, interposed between said follower and the ends of the shoes, said follower having a curved bearing surface adapting the spring plate to flex thereon.

6. In a friction shock absorbing mechanism, the combination with a friction shell; of opposed friction shoes cooperable therewith; a shock transmitting wedge operating between said shoes, one of said shoes having a wedge face at an angle which is acute and of high friction-creating capacity and non-releasing, and another opposing friction shoe having a face engaged by said shoe at a wedge-releasing angle opposed to said face of the first shoe; a spring resistance; and means, interposed between said spring resistance and said shoes, for automatically balancing the spring pressure on said shoes, said means comprising a spring follower at the end of the spring resistance adjacent the shoes and a spring plate, interposed between said follower and the ends of the shoes, said follower having a curved bearing surface adapting the spring plate to flex thereon.

7. In a friction shock absorbing mechanism, the combination with a friction shell having interior sets of opposed friction surfaces; of a plurality of sets of opposed friction shoes cooperable with the friction surfaces of the shell; pressure receiving and transmitting wedging means extended between said shoes, said means and shoe of one set on one side of the axis of the shell having engaging faces extending at a keen angle with respect to said axis, said means and opposed shoe of the corresponding set, on the other side of the axis, having cooperating faces inclined at a blunt releasing angle with respect to said axis; a spring resistance; and means interposed between said spring resistance and all of the shoes, for automatically balancing the spring pressure on the shoes, said means comprising a spring follower at the end of the spring resistance adjacent the shoes, a spring plate between said follower and the ends of one set of shoes, a block between said plate and the other set of shoes, a spring plate between said block and said other set of shoes, the bearing faces of the follower and block for said spring plates being curved and adapting the spring plates to flex about the respective curved faces of the follower and block.

8. In a friction shock absorbing mechanism, the combination with a friction shell having a plurality of sets of opposed friction surfaces on the interior thereof; of corresponding sets of opposed friction shoes cooperable with the friction surfaces of the shell; a shock transmitting wedge operating between and cooperable with all of said shoes, one of said shoes of each set having a wedge face at an angle which is acute and of high friction creating capacity and non-releasing, and another opposing friction shoe of each set having a face engaged by said wedge at a wedge releasing angle opposed to said wedge face of the other shoe of the corresponding set; a spring resistance; and means, interposed between said spring resistance and all of the shoes, for automatically balancing the spring pressure on the shoes, said means comprising a spring follower at the end of the spring resistance adjacent the shoes, a spring plate between said follower and the ends of one set of shoes, a block between said plate and the other set of shoes, a spring plate between said block and said other set of shoes, the bearing faces of the follower and block for said spring plates being curved and adapting the spring plates to flex about the respective curved faces of the follower and block.

9. In a friction shock absorbing mechanism, the combination with a friction shell having a plurality of sets of opposed friction surfaces on the interior thereof; of corresponding sets of opposed friction shoes cooperable with the friction surfaces of the shell; a shock transmitting wedge operating between and cooperable with all of said shoes, one of said shoes of each set having a wedge face at an angle which is acute and of high friction creating capacity and non-releasing, and another opposing friction shoe of each set having a face engaged by said wedge at a wedge releasing angle opposed to said wedge face of the other shoe of the corresponding set; a spring resistance; and means, interposed between said spring resistance and all of the shoes, for automatically balancing the spring pressure on the shoes, said means comprising a spring follower at the end of the spring resistance adjacent the shoes, a spring plate between said follower and the ends of one set of shoes, a block between said plate and the other set of shoes, a spring plate between said block and said other set of shoes, the bearing faces of the follower and block for said spring plates being curved and adapting the spring plates to flex about the respective curved faces of the follower and block, said curved bearing surfaces of the follower and block being cylindrical and struck about axes at right angles to each other.

In witness that I claim the foregoing I have hereunto subscribed my name this 14th day of July, 1922.

JOHN F. O'CONNOR.

Witnesses:
UNA C. GRIGSBY,
ANN BAKER.